(12) United States Patent
Ravi et al.

(10) Patent No.: US 9,201,638 B2
(45) Date of Patent: Dec. 1, 2015

(54) COMPILER-GUIDED SOFTWARE ACCELERATOR FOR ITERATIVE HADOOP® JOBS

(71) Applicant: NEC Laboratories America, Inc., Princeton, NJ (US)

(72) Inventors: Nishkam Ravi, Lawrenceville, NJ (US); Abhishek Verma, Plainsboro, NJ (US); Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 108 days.

(21) Appl. No.: 13/923,458

(22) Filed: Jun. 21, 2013

(65) Prior Publication Data

US 2014/0047422 A1     Feb. 13, 2014

Related U.S. Application Data

(60) Provisional application No. 61/680,299, filed on Aug. 7, 2012.

(51) Int. Cl.
G06F 9/45     (2006.01)
G06F 9/52     (2006.01)
G06F 9/54     (2006.01)

(52) U.S. Cl.
CPC ..... G06F 8/443 (2013.01); G06F 9/52 (2013.01); G06F 9/546 (2013.01)

(58) Field of Classification Search
None
See application file for complete search history.

(56) References Cited

U.S. PATENT DOCUMENTS

| 7,590,620 | B1 * | 9/2009 | Pike et al. | |
| 2012/0254193 | A1 * | 10/2012 | Chattopadhyay et al. | 707/747 |
| 2013/0086356 | A1 * | 4/2013 | Narang et al. | 712/30 |
| 2013/0227558 | A1 * | 8/2013 | Du et al. | 718/1 |
| 2013/0318119 | A1 * | 11/2013 | Dalal | 707/769 |
| 2013/0339321 | A1 * | 12/2013 | Doddavula et al. | 707/693 |

OTHER PUBLICATIONS

Liu et al., Panacea: Towards Holistic Optimization of MapReduce Applications, CGO '12, Mar. 31-Apr., San Jose, US.*
Zhang et al., iMapReduce: A Distributed Computing Framework for Iterative Computation, Mar. 25, 2012, Springer, http://download.springer.com/static/pdf/264/art%253A10.1007%252Fs10723-012-9204-9.pdf?originUrl=http%3A%2F%2Flink.springer.com%2Farticle%2F10.1007%2Fs10723-012-9204-9&token2=exp=1441909992~acl=%2Fstatic%2Fpdf%2F264%2Fart%25253A10.1007%25.*

(Continued)

*Primary Examiner* — Jue Louie
*Assistant Examiner* — Reshaun M Finkley
(74) *Attorney, Agent, or Firm* — Joseph Kolodka (57) ABSTRACT

Various methods are provided directed to a compiler-guided software accelerator for iterative HADOOP® jobs. A method includes identifying intermediate data, generated by an iterative HADOOP® application, below a predetermined threshold size and used less than a predetermined threshold time period. The intermediate data is stored in a memory device. The method further includes minimizing input, output, and synchronization overhead for the intermediate data by selectively using at any given time any one of a Message Passing Interface and Distributed File System as a communication layer. The Message Passing Interface is co-located with the HADOOP® Distributed File System.

8 Claims, 6 Drawing Sheets

(56) References Cited

OTHER PUBLICATIONS

Amazon Elastic MapReduce API Reference RunJobFlow: RunJobFlow, Mar. 31, 2009, 12-14, http://web.archive.org/web/20110813163904/http:/s3.amazonaws.com/awsdocs/ElasticMapReduce/latest/emr-api.pdf.*

Bu et al., "Haloop: efficient iterative data processing on large clusters" Proceedings of the VLDB Endowment, vol. 3, No. 1, Sep. 2010, pp. 285-296.

Malewicz et al., "Pregel: a system for large-scale graph processing" International Conference on Management of Data (SIGMOD), Jun. 2010, pp. 135-145.

Plimpton et al., "MapReduce in MPI for Large-Scale Graph Algorithims" Parallel Computing, vol. 37 Issue 9, Sep. 2011. (39 pages).

Zaharia et al., "Resilient distributed datasets: a fault-tolerant abstraction for in-memory cluster computing" In Proceedings of the 9th USENIX conference on Networked Systems Design and Implementation (NSDI), Apr. 2012. (14 pages).

Promegranate File System: https://github.com/macan/Pomegranate/wiki. Mar. 28, 2013. (3 pages).

Memcached Key-value Store: memcached.org. Mar. 28, 2013. (2 pages).

\* cited by examiner

COMPILER-GUIDED SOFTWARE ACCELERATOR FOR ITERATIVE HADOOP® JOBS

RELATED APPLICATION INFORMATION

This application claims priority to provisional application Ser. No. 61/680,299 filed on Aug. 7, 2012, incorporated herein by reference.

BACKGROUND

1. Technical Field

The present invention relates to data distribution, and more particularly to a compiler-guided software accelerator for iterative HADOOP® jobs.

2. Description of the Related Art

HADOOP® is the most commonly used open-source framework for MapReduce and processing large amounts of data. Data transfer and synchronization overheads of intermediate data for iterative HADOOP® applications is problematic. The problem arises because distributed file systems, such as HADOOP® Distributed File Systems, perform poorly for small short-lived data files.

HADOOP® launches a new job in every iteration which executes the same code repeatedly and reads invariant input data. Launching and scheduling new jobs is expensive.

A job is a collection of map and reduce tasks. Not all reduce tasks in a job finish at the same time. In an iterative HADOOP® workflow, the next iteration is launched upon completion of the current job. This prohibits asynchrony and parallelism across iterations.

No solutions currently exist to solve the aforementioned problems that provide a solution capable of working within the HADOOP® ecosystem without any changes to the software stack and without additional developer effort.

SUMMARY

These and other drawbacks and disadvantages of the prior art are addressed by the present principles, which are directed to a compiler-guided software accelerator for iterative HADOOP® jobs.

According to an aspect of the present principles, there is provided a method. The method includes identifying intermediate data, generated by an iterative HADOOP® application, below a predetermined threshold size and used less than a predetermined threshold time period. The intermediate data is stored in a memory device. The method further includes minimizing input, output, and synchronization overhead for the intermediate data by selectively using at any given time any one of a Message Passing Interface and a HADOOP® Distributed File System as a communication layer. The Message Passing Interface is co-located with the HADOOP® Distributed File System.

According to another aspect of the present principles, there is provided a method. The method includes identifying a set of map tasks and reduce tasks capable of being reused across multiple iterations of an iterative HADOOP® application. The method further includes reducing a system load imparted on a computer system executing the iterative HADOOP® application by transforming a source code of the iterative HADOOP ® application to launch the map tasks in the set only once and keep the map tasks in the set alive for an entirety of the execution of the iterative HADOOP® application.

According to yet another aspect of the present principles, there is provided a method. The method includes automatically transforming an iterative HADOOP® application to selectively use at any given time any one of a Message Passing Interface and a HADOOP® Distributed File System depending on parameters of a data transfer in the iterative HADOOP® application. The Message Passing Interface is co-located with the HADOOP® Distributed File System. The method further includes enabling concurrent execution by at least one processor of a reduce task from an iteration n and map tasks from an iteration n+1 in the iterative HADOOP ® application, n being an integer. The enabling step includes replacing an invocation to a runJob( ) function in the iterative HADOOP® application by an invocation to a submitJob( ) function. The enabling step further includes inserting a function call into the iterative HADOOP® application for blocking and reading model data from a Message Passing Interface based data distribution library connected to the Message Passing Interface.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a compiler-guided software accelerator for iterative HADOOP® jobs. HADOOP® refers to an open-source software framework for supporting data-intensive distributed applications. HADOOP® implements a computational and programming model known as MapReduce, where an application is divided into many fragments of work that can be executed or re-executed on any node (e.g., computer) in, e.g., a cluster (collection of nodes). HADOOP® and MapReduce are described further herein, along with the inventive features of the present principles applied thereto.

Advantageously, in an embodiment, the present principles solve the problem of minimizing data transfer and synchronization overheads of intermediate data for iterative MapReduce/HADOOP® applications. The problem arises because distributed file systems, such as HADOOP® Distributed File Systems, perform poorly for small short-lived data files. In an embodiment, the present principles solve the problem by creating an MPI-based in-memory data distribution library for HADOOP® and developing a compiler transformation for selectively and automatically replacing some of the invocations to a HADOOP® Distributed File System (HDFS) by invocations to the library. In an embodiment, the solution is designed as a lightweight plug-in to the HADOOP® stack, and provides performance gains without any modification to either the software stack or the applications. As such, the present principles can be easily used with existing HADOOP® systems. This and other advantages are provided by the present principles.

Advantageously, in an embodiment, the present principles solve the problem of keeping jobs (i.e., map and reduce tasks) alive across iterations in order to minimize the overhead of launching a new job in each iteration. In an embodiment, the present principles solve the problem by applying compiler transformations to the HADOOP® application.

Advantageously, in an embodiment, the present principles solve the problem of introducing asynchrony and parallelism across iterations, such that reduce tasks from one iteration can execute in parallel with map tasks from the next iteration. In an embodiment, the present principles solve the problem by applying compiler transformations to the HADOOP® application.

Figure 1:
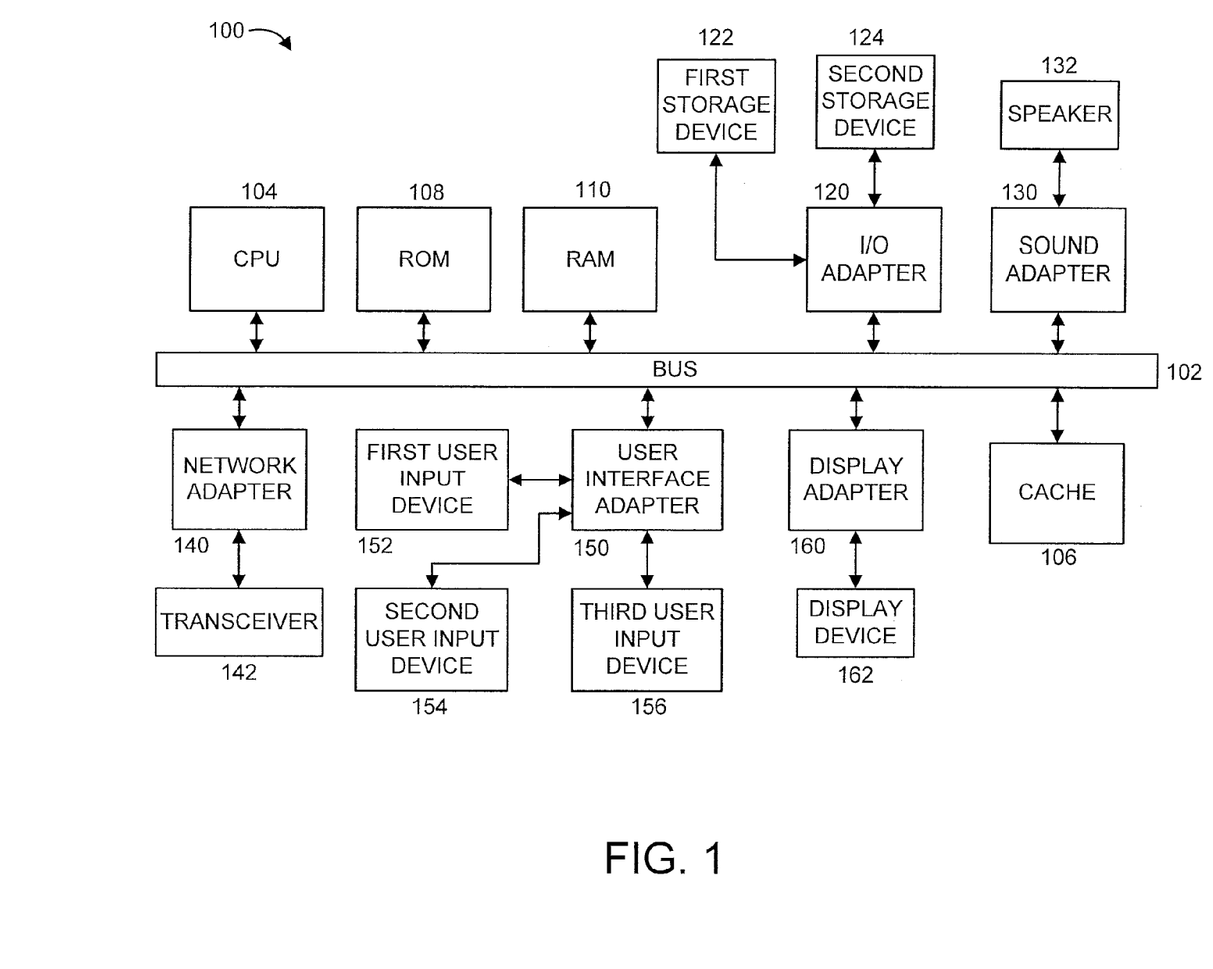
FIG. 1 is a block diagram illustrating an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130.

A transceiver 142 is operatively coupled to system bus 102 by network adapter 140.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

A display device 162 is operatively coupled to system bus 102 by display adapter 160.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
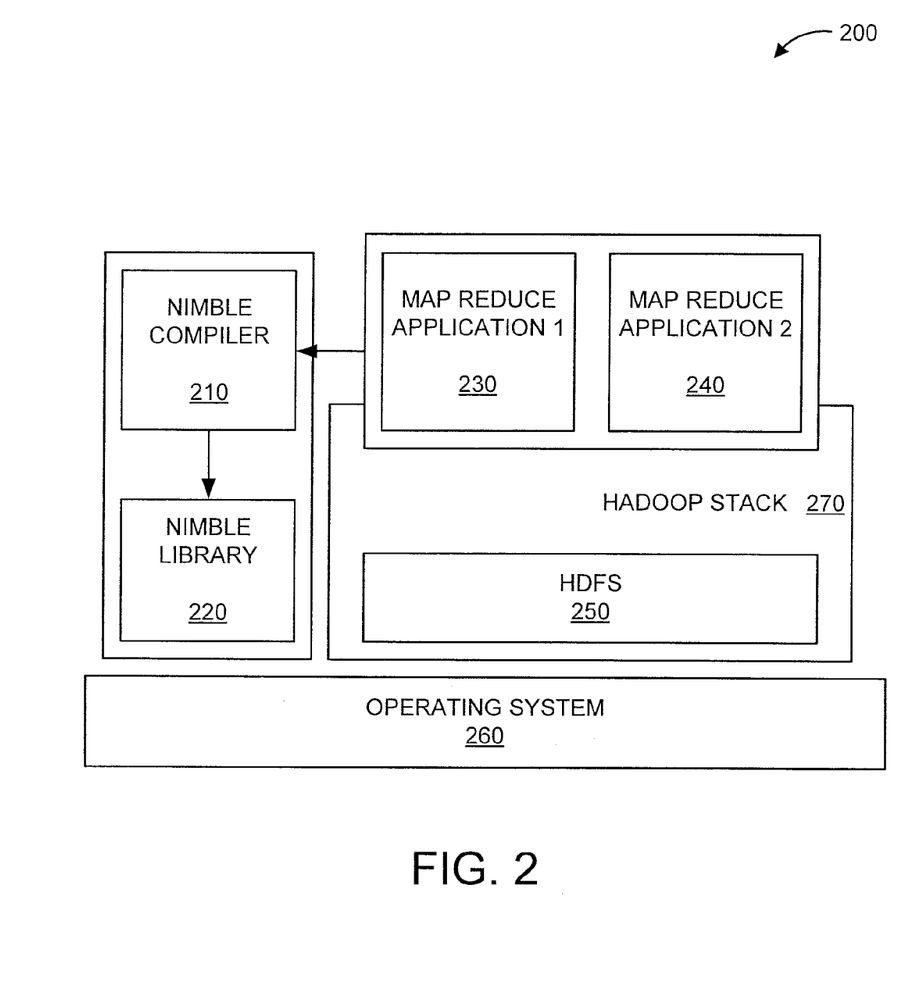
FIG. 2 shows a system 200, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
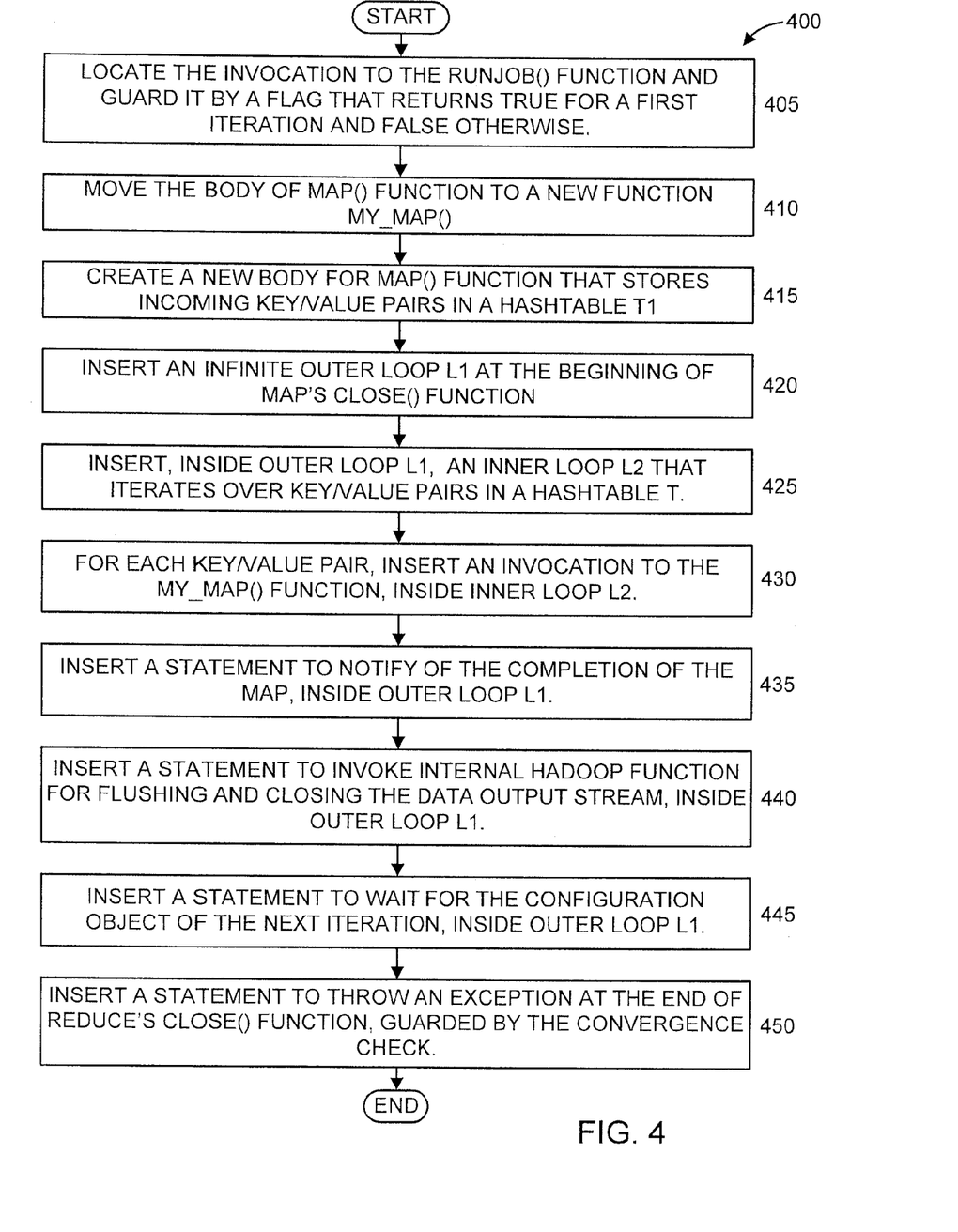
FIG. 4 shows an exemplary method 400 for software acceleration for iterative HADOOP® jobs using a TaskReuse Optimization, in accordance with an embodiment of the present principles.
Figure 5:
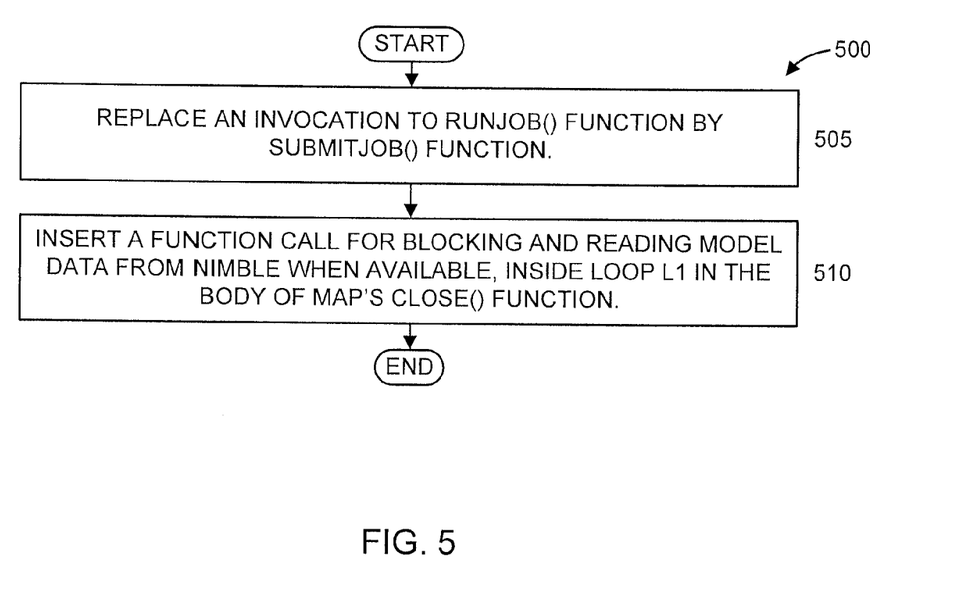
FIG. 5 shows an exemplary method 500 for software acceleration for iterative HADOOP® jobs using an AsyncPipeline Optimization, in accordance with an embodiment of the present principles.
Figure 6:
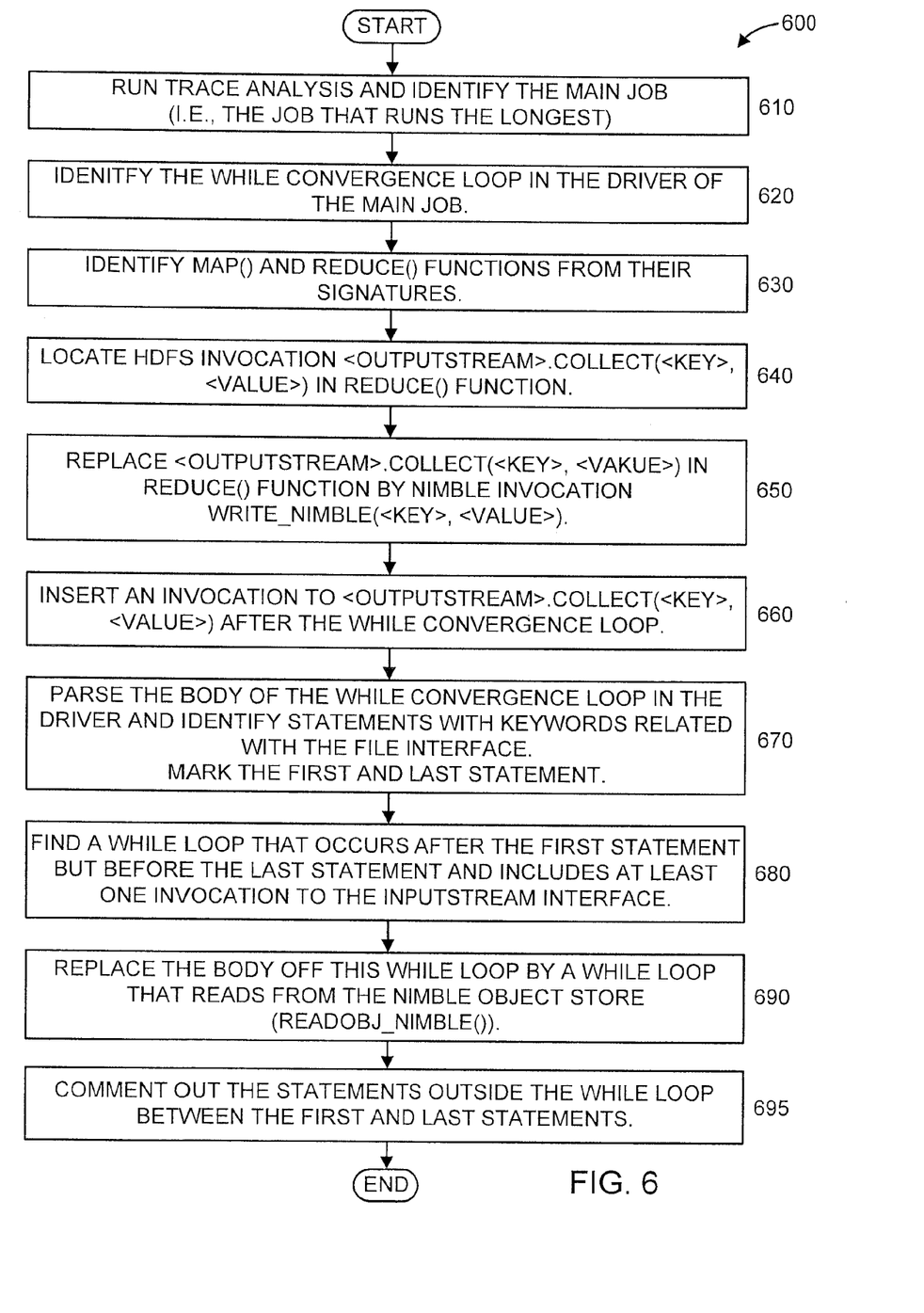
FIG. 6 shows an exemplary method 600 for software acceleration for iterative HADOOP® jobs using a FastPath optimization, in accordance with an embodiment of the present principles.

Further, it is to be appreciated that processing system 100 may perform at least part of the method described herein including, for example, at least part of method 400 of FIG. 4 and/or at least part of method 500 of FIG. 5 and/or at least part of method 600 of FIG. 6. Similarly, part or all of system 200 may be used to perform at least part of method 400 of FIG. 4 and/or at least part of method 500 of FIG. 5 and/or at least part of method 600 of FIG. 6.

HADOOP® has emerged as the dominant open-source platform for large-scale data processing. HADOOP® supports MapReduce style of programming and provides developers an easy to use application programming interface (API). HADOOP HADOOP® is rapidly evolving into an ecosystem, allowing new technologies to be built around and on top of it. Given the diverse set of workloads that HADOOP® supports, domain-specific optimizations hold a lot of promise.

Herein, we advocate the idea of developing domain-specific software accelerators for HADOOP® that can be deployed and maintained independently without requiring modification to the HADOOP® stack or to the application. This approach is complementary to that of creating domain-specific APIs or customized HADOOP® stacks, which has been the primary trend so far.

A cross-industry study of HADOOP® workloads shows that majority of interactive HADOOP® jobs are iterative, operate on relatively small input datasets ranging from a few MBs to a few GBs, and can be executed in memory.

We develop an industrial-strength software accelerator, called Nimble, targeted towards iterative HADOOP® jobs. Nimble has two key components: an MPI-based data distribution library that coexists with HDFS; and a compiler for applying source-to-source transformations to HADOOP® applications.

HADOOP® is the dominant open-source framework for MapReduce. HADOOP® provides an easy to use API for developing large scale data parallel applications as well as open-source and commercial middleware for data analytics.

With the growing popularity of HADOOP®, the diversity of applications being built on top of it (directly or indirectly) is increasing. Originally intended for offline batch-processing jobs, HADOOP® is now being increasingly used for short and interactive jobs, which can be characterized based on their structure, dataflow characteristics, input data size and execution time. Improving the performance of these jobs is an open problem.

A description will now be given of a design rationale, in accordance with an embodiment of the present principles.

Performance requirements that are common across the different categories of applications can be identified and addressed by improving HADOOP®. For category-specific requirements, however, specialized solutions are required. These can be delivered in the form of domain-specific APIs that either work within the HADOOP® ecosystem (e.g., HADOOP®, HADOOP® Online, "Partitioned Iterative Convergence" (PIC) or outside it (Twister, "Resilient Distributed Datasets" (RDD). In both cases, developer involvement is required and adoption depends on developers' expertise and willingness to understand and use the APIs. A third approach is to retain the HADOOP® API but implement a different software stack underneath; which provides a viable alternative to organizations running interactive in memory MapReduce jobs without requiring additional development effort or training.

Herein, we propose another way to deliver domain-specific performance solutions: as software accelerators. Software accelerators are libraries that are retrofitted into applications selectively using source-to-source compiler transformations (as shown in TABLE 1). In particular, TABLE 1 shows source-to-source transformations which allow selective replacement of function calls (as shown in the second snippet) as compared to solutions that virtualize the HADOOP® API by implementing a different stack underneath (as shown in the third snippet). Additional compiler optimizations are applied to the application source code when possible. In this model, the HADOOP® stack is retained as it is and minimal developer involvement is needed. The application is preprocessed and optimized using a source-to-source compiler before being compiled and executed.

TABLE 1

```
public void f( ) {        public void f( ){         public void f( ) {
    ...                       ...                       ...
    hdfs.write( );            hdfs.write( );            differentStack.
    ...                       ...                              write( ) ;
    hdfs.write( );            if(..) {                  ...
    ...                           nimble.write( );      differentStack.
}                             }else{                          write( ) ;
                                  hdfs.write( );        ...
                              }                         }
                              ...
                          }
```

Software accelerators (much like hardware accelerators) are installed and maintained independently and co-exist with, rather than replace, the original software stack. Software accelerators act as domain-specific composable plug-ins.

This approach is best suited for organizations that run a variety of MapReduce jobs (e.g., batch-processing, interactive, streaming, and so forth) and, therefore, find it hard to switch stacks. For such organizations, a combination of generality/familiarity offered by HADOOP® and improved performance (offered by software accelerators) is desirable.

Software accelerators can be incrementally deployed alongside existing HADOOP® installations. In design philosophy, software accelerators empower the applications by exporting certain middleware-level functionalities to application space, instead of modifying the underlying stack/OS. Software accelerators are characterized by high internal complexity and low external complexity.

A cross-industry study of HADOOP® workloads shows that more than 60% of HADOOP® jobs operate on relatively small input datasets ranging from a few MBs to a few GBs, and can be executed in memory. Most of these workloads are iterative, that is, the output of reduce tasks is fed back to the map tasks. In certain cases, the output of a job may be postprocessed by another job(s) before being fed back. Multi job iterative applications can potentially be reduced to a single-job structure using vertical and horizontal packing.

HADOOP® is unaware of the iterative nature of workloads and treats each iteration as an independent job, which leads to sub-optimal performance. A workload being iterative is an application-level property and can be treated as such without modifying the underlying middleware.

A description will now be given of a HADOOP® Distributed File System (HDFS) and model data, in accordance with an embodiment of the present principles.

In HADOOP®, all data transfer and synchronization is done using the HADOOP® Distributed File System (HDFS). Distributed file systems provide a reliable and scalable way to share large datasets. Most distributed file systems impose performance penalties in the form of disk accesses, network lookup operations, consistency management and replication. While these overheads can be overlooked (and are somewhat necessary) for sharing and storing large datasets, they become significant and unnecessary for small short-lived data.

In iterative workloads, the output of reduce tasks (henceforth model) is written to HDFS and read in the next iteration (implicitly or explicitly). Each iteration refines the model until a termination condition is satisfied. The output of reduce tasks from the last iteration is the final result. Model data is small and transient and can potentially be kept in memory and transferred over a faster data path.

A description will now be given regarding job launch time and input data, in accordance with an embodiment of the present principles.

HADOOP® launches a new job in every iteration which spawns a new set of maps and reduces tasks that execute the same code repeatedly. Launching and scheduling new jobs/JVMs is expensive. Also, invariant input data is read from HDFS repeatedly in each iteration (during the launch of map tasks) and parsed as key/value pairs. Launching a job and reading input data can take as much time as execution of a map or reduce task.

The first generation of map and reduce tasks could potentially be kept alive throughout the lifetime of the application. This would save the time spent on re-launching jobs as well as re-reading invariant input data without requiring an input data cache.

A description will now be given regarding synchronous data transfer and execution, in accordance with an embodiment of the present principles.

In an iterative HADOOP® workflow, the next job/iteration is launched upon completion of the current job. Although the real dependence is on the previous jobs outputs, by blocking the completion of the entire job (i.e., all reduce tasks), this need for input availability is implicitly satisfied in a collective sense. In doing so, however, room for asynchrony and parallelism (across iterations) is lost.

A job is a collection of map and reduce tasks, which are consumers and producers, respectively, in an iterative workflow. Not all reduce tasks in the job finish at the same time. Depending on the interaction of the partitioner function with the dataset, this skew in reducer completion times can vary significantly. There are several reasons for this. First, the start timestamp of each reduce task can be different. Second, the size of input data assigned to each reduce task can be different. Third, nodes in the cluster can perform differently. Fourth, the HADOOP® scheduler can perform sub-optimally.

We have observed skews of up to 40% for certain input datasets. It would be beneficial to introduce asynchrony and overlap communication with computation in order to enable parallel execution between reduce tasks from iteration n and map tasks from iteration n+1.

An overview of Nimble will now be given, in accordance with an embodiment of the present principles.

We have designed and implemented a software accelerator for iterative jobs, called Nimble. Nimble includes two key components: (i) an MPI-based data transfer and synchronization library, and (ii) a source-to-source compiler for HADOOP® applications. Herein, we present Nimble's design, which was converged upon after several iterations. We started by modifying HADOOP® and the applications to see how much performance could be obtained. We then worked on identifying ways to take the changes out of HADOOP® and developing source-to-source transformations for applications alongside the MPI-based library.

Nimble co-exists with HADOOP®/HDFS. The applications are preprocessed and optimized using a source-to-source compiler (henceforth "Nimble compiler"). In the process: (i) certain invocations to HDFS are selectively replaced by invocations to the MPI-based library (henceforth Nimble library). Additional optimizations are applied to: (ii) keep map tasks alive during the entire lifetime of the application in order to minimize redundant I/O and job launch overhead, (iii) enable concurrent execution between map tasks and reduce tasks across iterations.

In addition to applying source-to-source transformations, a number of hacks had to be applied to un-modify HADOOP®, such as overriding Java encapsulation, using HADOOP®'s fault tolerance mechanism for performance, evicting HADOOP® cache, among others. This allows Nimble to be used alongside different HADOOP® stacks.

The key guiding principle in Nimble's design is that the HADOOP® stack should stay unmodified and the developer effort required for adopting it should be negligible. Two observations allow us to attempt this design. First, there are opportunities to optimize performance at the application level. These opportunities can be leveraged using source-to-source compilers, which are relatively less explored in the big data space. Second, parts of the middleware that are at the edge (interact directly with the applications) can be brought up to the application space and modified if needed, leaving the underlying middleware unmodified.

MPI and MapReduce/HADOOP® are the two most commonly used technologies for cluster computing. They have complimentary properties. HADOOP® exports a high-level Java based API that provides ease of programming, scalability and fault-tolerance. HDFS is the underlying data communication mechanism, which is well-suited for sharing and storing large datasets in a distributed memory cluster but performs sub-optimally for small short-lived data. MPI, on the other hand, provides a low-level programming interface but performs extremely well for small transient data. MPI is also well supported by the open-source community. MPI collective operations have been optimized over the years and demonstrate good performance for broadcast and multicast. The two technologies can potentially be composed at the application level, without modifying the underlying stack.

A description will now be given of a Nimble library, in accordance with an embodiment of the present principles.

The model data generated during execution of iterative/multi-wave HADOOP® applications is relatively small and often gets smaller as the job progresses. Unlike input data which persists during the entire lifetime of an application (often days or weeks), model data is short-lived and alive for only one iteration (typically seconds or minutes). Also, since model data is usually read by a large fraction of active nodes, a broadcast/multicast-based sharing mechanism is more suitable than a lookup-based one. Despite the differences in their properties, model and input data are treated identically by HDFS.

A lookup/pull-based data transfer model (e.g., HDFS) is convenient when the producer-consumer relationships are unknown. In practice, inter-job data-dependence relationships can be derived from HADOOP® job workflows and push-based data transfer mechanisms can be employed for better performance.

As part of Nimble library, we design an MPI-based data distribution mechanism for HADOOP® applications that can sit alongside HDFS and be selectively used by applications (see, e.g., FIG. 2). It is currently used for: (i) transferring model data (as part of FastPath Optimization); and (ii) synchronization between map and reduce tasks (needed for TaskReuse and AsyncPipeline optimizations). These optimizations are described hereinafter. A brief overview of Nimble's MPI-based data transfer architecture follows.

FIG. 2 shows a system 200, in accordance with an embodiment of the present principles. The system 200 includes a Map Reduce Application-1 (App-1) 210, a Map Reduce Application-2 (App-2) 220, a HADOOP® Distributed File System 230, an operating system (OS) 240, a Nimble compiler 250, an Nimble library 260 (interchangeably referred to herein as "Nimble"), and a HADOOP® stack 270.

Nimble's data distribution mechanism has been designed on the model of distributed object stores. The key difference is that remote lookups are avoided by keeping the reads always local. Accordingly, writes are pushed to the consumers using a broadcast/multicast mechanism. Components of the object store are designed to support concurrent accesses and minimize contention.

Figure 3:
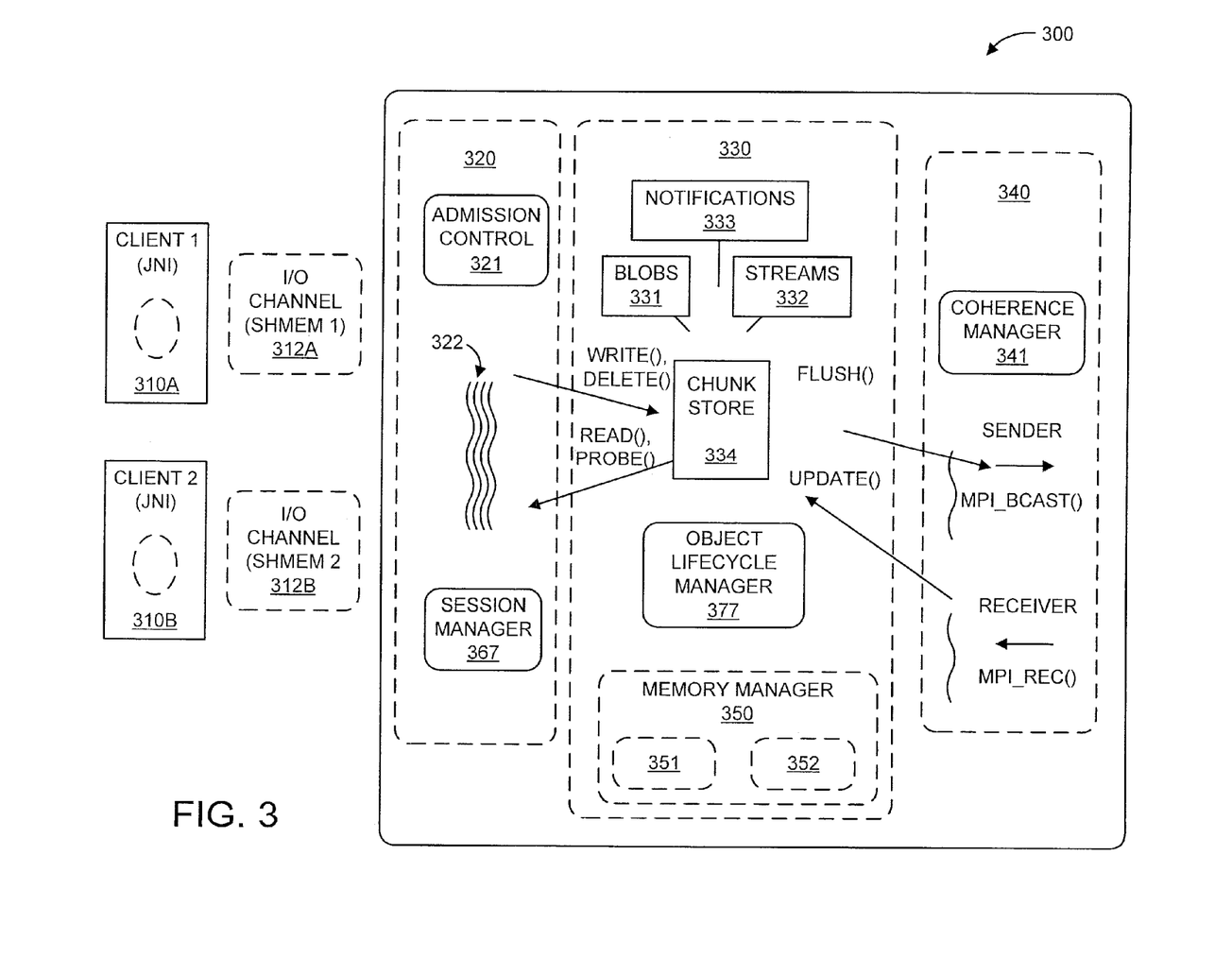
FIG. 3 shows the architecture of a Nimble (MPI-based data distribution) library 300, in accordance with an embodiment of the present principles.

FIG. 3 shows the architecture of a Nimble (MPI-based data distribution) library 300, in accordance with an embodiment of the present principles. The Nimble library 300 can be implemented, for example, as the Nimble library 260 shown in FIG. 2.

The Nimble library 300 has been implemented in C and runs as a service on each node. Client Java processes 310A and 310B (in the HADOOP® application) communicate with the service through a JNI library (designed by the characters "JNI" in FIG. 3). Nimble service has three key components: a client manager 320; an object store 330; and a networking module 340.

The client manager 320 handles incoming requests from map and reduces tasks. An admission control thread 321 waits for registration requests from client threads within the same physical host. On detecting a new registration, the admission control thread 321 creates a session for the incoming client and hands it off to a worker thread 322, dedicated to serving the client till the lifetime of the session. A session manager 367 is used to manage a session. The client 310A co-ordinates with the peer worker thread 322 to establish a shared memory region as an I/O channel 312A to save an extra round of copying from client address space. Similarly, the client 310B co-ordinates with the peer worker thread 322 to establish a shared memory region as an I/O channel 312B to save an extra round of copying from client address space.

The worker thread 322 serves the IO operations issued by the client 310, which include write, probe, read, delete, writeall, and readall for various object types supported by Nimble (blobs 331, streams 332, and notifications 333).

The object store 330 resides in main memory. Each object type (i.e., blobs 331, streams 332, and notifications 333) has a distinct namespace. Objects are stored as variable-size lists of fixed-size memory chunks in a chunk store 334. The metadata and lifecycle of each object type is handled separately. Chunks come from a pre-allocated pool of memory, which can be grown-on-demand and trimmed according to application needs. A memory manager 350 is responsible for pre-allocation and garbage collection, and includes a pre-allocator 351 and a garbage collector 352 for these tasks, respectively.

To maximize throughput of concurrent writes, an object lifecycle manager 377 maintains distinct partitions for various object types and their lifecycle stage to avoid false contentions. For transmission, the chunks are fragmented into maximum transfer units (MTUs), to allow for tuning and maximal network throughput.

If the set of objects grows to a large number, the overheads of crossing over to Nimble's address space and propagation can become non-trivial for the set as a whole. To address this issue, Nimble 300 exports the readall/writeall interface to buffer all reads and writes within the clients address space and commit the entire buffer to the local Nimble instance in a single transaction.

The networking module 340 handles the sending and receiving of data. Write propagation is done using MPI broadcast. Since there is one sender per node and multiple clients (i.e., reduce tasks), the write requests are queued up and outgoing data is buffered in the object store.

To ensure safe access of IO channel, writes block the client thread for local write completion. Write propagation to the cluster, however, happens asynchronously coordinated by a coherence manager 341 via periodic heartbeats. The heartbeat mechanism periodically refreshes a globally replicated directory of pending updates/deletions/etc., which offers a common schedule for data exchange across various instances in the cluster. For simplicity, updates are atomic and versioning, to maintain stale objects and so forth, is not supported.

Invocations to the Nimble library 300 are automatically inserted into the application by the Nimble source-to-source compiler described next.

FIG. 4 shows an exemplary method 400 for software acceleration for iterative HADOOP® jobs using a TaskReuse Optimization, in accordance with an embodiment of the present principles.

At step 405, locate an invocation to the runJob( ) function and guard the runJob( ) function by a flag that returns true for a first iteration and false otherwise.

At step 410, move the body of map( ) function to a new function my_map( ).

At step 415, create a new body for map( ) function that stores incoming key/value pairs in a hashtable T1.

At step 420, insert an infinite outer loop L1 at the beginning of map's close( ) function.

At step 425, insert, inside outer loop L1, an inner loop L2 that iterates over key/value pairs in hashtable t.

At step 430, for each key/value pair, insert an invocation to my_map( ) function, inside inner loop L2.

At step 435, insert a statement to notify of the completion of the map, inside outer loop L1.

At step 440, insert a statement to invoke internal HADOOP® function for flushing and closing the data output stream, inside outer loop L1.

At step 445, insert a statement to wait for the configuration object of the next iteration, inside outer loop L1.

At step 450, insert a statement to throw an exception at the end of reduce's close( ) function, guarded by the convergence check.

FIG. 5 shows an exemplary method 500 for software acceleration for iterative HADOOP® jobs using an AsyncPipeline Optimization, in accordance with an embodiment of the present principles.

At step 505, replace an invocation to the runJob( ) function by the submitJob( ) function.

At step 510, insert a function call for blocking and reading model data from Nimble when available, inside loop l1 in the body of map's close( ) function.

A further description will now be given of Nimble optimizations, in accordance with an embodiment of the present principles.

Nimble is an optimizing compiler for HADOOP® applications. The Nimble compiler 250, as shown in FIG. 2, applies source-code and byte-code transformations. Before applying the optimizations, the compiler 250 identifies the overall structure of the application, i.e. the main job being optimized, the body of the outer while/for loop in the driver, the map function and the reduce function. This can be done using a combination of static program analysis and execution trace analysis.

A description will now be given of a fast path optimization, in accordance with an embodiment of the present principles.

FIG. 6 shows an exemplary method 600 for software acceleration for iterative HADOOP® jobs using a FastPath optimization, in accordance with an embodiment of the present principles. The method 600 automatically and selectively replaces invocations to the HADOOP® Distributed File System with invocations to the Message Passing Interface (the MPI-based data distribution library).

At step 610, run trace analysis and identify the main job (i.e., the job that runs the longest).

At step 620, identify the while convergence loop in the driver of the main job. If this step fails, the method is terminated.

At step 630, identify map( ) and reduce( ) functions from their signatures.

At step 640, locate HDFS invocation <outputStream>.collect(<key>, <value>) in reduce( ) function.

At step 650, replace <outputStream>.collect(<key>, <value>) in reduce( ) function by Nimble invocation write_Nimble(<key>, <value>).

At step 660, insert an invocation to <outputStream>.collect (<key>, <value>) after the while convergence loop.

At step 670, parse the body of the while convergence loop in the driver and identify statements with keywords related with the file interface, e.g., File system, File, and so forth. Mark the first and last statements. If this step fails, the method is terminated.

At step 680, find a while loop that occurs after the first statement but before the last statement and includes at least one invocation to the InputStream interface, e.g., readFile. If this step fails, the method is terminated.

At step 690, replace the body of this while loop by a while loop that reads from the Nimble object store (readobj_Nimble( )). Copy the serialization code into this loop.

At step 695, comment out the statements outside the while loop between the first and last statements.

Model data can potentially be merged and read along with input data files. Since the Nimble library is only used for communicating variant/model data, a mechanism is needed to separate it from invariant input data. We define a new directive called #pragmavariant, which can be used by developers to mark variant data elements that constitute the model (as shown in the definition of class Vertex in TABLE 2). The Nimble compiler 250 does the rest. The Nimble compiler 250 generates code for writing and reading variant data using the Nimble library 500 while invariant data is handled as before (i.e., written to HDFS and read implicitly in the next iteration). The use of pragma variant is the only developer assistance needed in Nimble. In another embodiment, we eliminate the need for this construct by automatically identifying variant data using a combination of static and runtime data dependence analysis. An original code structure is shown in TABLE 2. Application of fast path optimization, along with other Nimble optimizations, is shown in TABLE 3 herein below.

TABLE 2

```
public class Vertex implements Writeable {
    protected String id;
    protected Set<VertexEdge> neighbors;
    protected Map<String, Writable> labels;
    protected Double Writable pagerank;
    ...
}
public class PageRank{
    public void execute ( ) {
        ...
        while (iteration < MAX_STEPS) {
            JobConf config = new JobConf( ) ;
            ...
            job = JobClient.runJob(config) ; // blocks for job completion
            if (is_converged (config)) {
                break;
            }
            iteration++;
        }
        ...
    }
    ...
}
public class PRMap extends MapReduceBase implements Mapper <Test,
        Vertex, Text, ObjectWritable > {
    public void map (Text key, Vertex value, OutputCollector <Text,
            ObjectWritable> collector, Reporter reporter) {
            {body of map}
            collector.collect (map_output_key, map_output_value) ;
    }
    public void close ( ) {
        ...
    }
}
public class PRReduce extends MapReduceBase implements Reducer <Text,
        ObjectWritable, Text, Vertex> {
    public void reduce (Text key, Interator < ObjectWritable > values,
            OutputCollector <Text, Vertex> collector, Reporter
            reporter) {
            {body of reduce}
            collector.collect (output_key, output_value) ;
    }
    public void close ( )
        ...
    }
}
```

A description will now be given of task reuse optimization, in accordance with an embodiment of the present principles.

A new job is launched in every iteration (by invoking runJob( )) that spawns a new set of map and reduce tasks, which execute the same code repeatedly. There are significant overheads associated with launching a new set of map and reduce tasks in every iteration. This includes: (i) the cost of launching JVMs; (ii) the cost of scheduling tasks in the cluster; and (iii) the cost of re-reading invariant input data. These overheads can be minimized by launching map tasks once and keeping them alive for the entire duration of the application. However, doing this without modifying HADOOP® is nontrivial.

Map task is described by three key functions: config( ), map( ) and close( ). When a map task is launched, config( ) is invoked first, followed by one or more invocations of map( ) depending on the input data size, followed by close( ). After the close( ) function executes to completion, the control is returned back to the HADOOP middleware, which flushes and closes the output stream thereby ending the process associated with the map task. When the output stream is closed, the JobTracker receives a signal indicating that the map task has ended. The output of the map task is passed on to the shuffle phase, eventually causing the reduce tasks to execute.

The Nimble compiler applies six key transformations to keep map tasks alive. First, in order to prevent re-launching of map/reduce tasks in every iteration, the invocation to run Job( ) is guarded (conditioned upon) by a flag, which is set to true for the first iteration and false for the remaining iterations.

Second, the entire body/code of the map( ) function is moved to the beginning of the close( ) function. The new map( ) function simply stores the incoming key/value pairs in a hash table for later use by the close( ) function.

Third, a two-level nested loop is introduced in the new body of the close( ) function. The inner loop iterates over the key/value pairs stored in the hash table by the map( ) function. The outer loop keeps the map task alive throughout the lifetime of the application.

Fourth, each iteration of the outer loop should be equivalent to the execution of a map task in the original version. In order to accomplish this, Nimble needs to make sure that the output stream is flushed and closed at the end of each iteration, so that map output data can be passed on to the shuffle phase. In the original version, this would be done by the HADOOP® middleware at the end of each map task. In the transformed version, the control is retained within the map task and not returned back to the middleware at the end of each iteration. Therefore, the Nimble compiler has to insert suitable invocations to the internal HADOOP® functions at the end of the iteration.

Intuitively speaking, Nimble in-lines some of the functionality of the middleware and brings it up to application space. This approach is powerful but technically challenging. One of the challenges in invoking internal HADOOP® functions from the application is that some of them are private functions not accessible from the application space. In order to overcome this challenge, Nimble overrides Java encapsulation (as described herein).

Fifth, a blocking call (nimble.wait( )) is inserted at the end of every iteration (of the outer loop in close( ) function). The purpose is to wait for the configuration object of the next iteration to become available in the object store.

In the original code structure shown in TABLE 2, the configuration object is passed on to map and reduce tasks as a parameter to runJob( ). In the transformed code structure after applying Nimble optimization as shown in TABLE 3, the configuration object is communicated by the driver to map and reduce tasks using Nimble.

Sixth, reduce tasks can potentially be kept alive using a similar approach (inserting a loop in the body of reduce). However, implementing the same approach for reduce would require substantial portions of HADOOP® to be brought up to the application space, including parts of the shuffle logic which is embedded deep inside HADOOP®. Instead, Nimble employs HADOOP®'s fault-tolerance mechanism to automatically re-launch reduce tasks, as described next.

The Nimble compiler inserts a statement to throw an exception at the end of the body of reduce( ) function. Consequently, every time a reduce task finishes, an exception is thrown and HADOOP® is led to believe that the execution did not go through successfully. As a result, a new reduce task is launched immediately. This reduce task attempts to fetch data generated by map tasks. Without intervention, it would fetch the data from the last iteration and get into an infinite loop. In order to avoid this, Nimble deletes the data from the last iteration and evicts HADOOP®'s cache. The reduce task now blocks on the data that would be generated in the next round. Since the launching and scheduling of reduce tasks happens in parallel with the execution of map tasks, the overheads are completely hidden. TABLE 3 shows the transformed code structure after applying Nimble optimizations.

TABLE 3

```
public class Vertex implements Writable {
    protected String id;
    protected Set<VertexEdge> neighbors;
    protected Map<String, Writable> labels;
    # pragma variant
    Protected Double Writable pagerank;
    ...
}
public class PageRank {
    public void execute ( ) {
        ...
        while (iteration < MAX_STEPS ) {
            jobConf config = new JobConf ( ) ;
            ...
            Nimble.notify (ITERATION_START) ;
            if (iteration = = 0) { // launch map/reduce tasks only once
                job = JobClient.submitJob (config); // non-blocking job
                submission
            }
            Nimble.waitall (config.getNumReduce ( ), REDUCE_
            COMPLETE) ;
            if (is_converged(config)) {
                number.set_converged ( ) ;
                break;
            }
            iteration++;
        }
        ...
    }
}
public class PRMap..implements Mapper < Text, Vertex, Text,
ObjectWritable>{
    public void my_map (Text key, Vertex value, OutputCollector
    collector ..) {
        (body of original map function)
        collector.collect (map_output_key, map_output_value) ;
    }
    public void map (Text key, Vertex value, OutputCollector collector ..) {
        Nimble.collect_inout(key, value) ; // collect key/value pairs
    }
    public void close ( ) {
        ...
        while (true) { // loopy map to enable TaskReuse optimization
        \\ block on data and read model output as soon as it comes
        \\ update model speculatively (for asynchrony/pipelining)
        Nimble.block_and_read_model ( ) ; // read from Nimble object store
        ..
        // Iterate over collected key/value pairs and invoke map
        Iterator <Text> key_i = number.get_inout_keys_iterator ( ) ;
        while (key_i.hasNext ( )) {
            if (i > 0) {
                value = Nimble.get_input_value(key) ;
                Nimble.merge_input_model (value, model) ; // variant field
            }
            this.my_map (key, value, collector, reporter) ; // invoke the
            actual map
        }
        if ( Nimble.is_converged ( )) {
            break; // abort
        }
        my_close ( ); // original close
        Nimble.notify (MAP_COMPLETE) ;
        i++;
        Nimble.call_hadoop_internal1 ( ) ; // callback into HADOOP
        Nimble.wait (ITERATION_START) ; // wait for next iteration
        }
    }
}
```

TABLE 3-continued

```
public class PRReduce.. implements Reducer <Text, ObjectWritable, Text,
Vertex> {
    public void reduce ( Text key, Iterator values, OutputCollector
    collector..) {
        {body of original reduce function}
        model_val = Nimble.get_model_frm_val (value) ; // derived from
        variant fld
        if (!Nimble.is_converged ( )) {
            Nimble.write_model (output_key, model_val) ; // send data using
            Nimble
        }else{
            collector.collect (output_key, model_val);
        }
    }
    public void close ( ) {
        my_close ( ) 1 // original close
        Nimble.notify (REDUCE_COMPLETE) ;
        Nimble.call_hadoop_internal2 ( ) ; // callback into HADOOP
        Nimble.wait (ITERATION_START) ; // wait for next iteration
        if (!Nimble.is_converged ( )) {
            // leverage HADOOP's fault-tolerance to re-launch reduce task
            throw new IOException ("Re-launch reduce task")
        }
    }
}
```

A description will now be given of AsyncPipeline Optimization reduce tasks, in accordance with an embodiment of the present principles.

In a typical iterative HADOOP® workflow, the job launcher blocks on completion of current job before launching the next job/iteration. Although the real dependence is on previous jobs outputs, by blocking on the completion of the entire job, this need for input availability is implicitly satisfied in a collective sense. In doing so, however, room for asynchrony and parallelism (across iterations) is lost.

As noted above, a job is a collection of map and reduce tasks, which are consumers and producers respectively in an iterative workflow. Not all the reduce tasks in the job finish at the same time. Depending on the interaction of the partitioner function with the dataset, this skew in reducer completion times can vary significantly. In HADOOP®, the decision to launch the next job is taken after the entire batch of reduce tasks executes to completion.

AsyncPipeline optimization exploits this headroom for asynchrony by ignoring the job completion barrier and allowing the consumers (i.e., map tasks) to block on data instead, which gets pushed to them as it is produced in the system. This is done by: (i) replacing occurrences of JobClientrunJob( ) by the non-blocking call JobClientsubmitJob( ); and (ii) inserting an invocation to nimble.block_and_read_model( ) at the beginning of map tasks to block on data produced by reduce tasks. As a result of this transformation, execution of reduce tasks from one iteration can be overlapped with execution of map tasks from next iteration. TABLE 3 shows the final transformed code for the code structure in TABLE 2.

Thus, we define a software accelerator as a combination of a performance library and a source-to-source compiler. We argue that software accelerators are a good vehicle for delivery of ideas and performance optimizations for existing middleware and applications. We present Nimble, a software accelerator for HADOOP® that optimizes application performance by selectively replacing invocations to HDFS by invocations to an MPI-based library. Nimble also applies optimizations to keep map and reduce tasks alive across iterations in order to prevent redundant start-up and data access costs; and to pipeline data from reduce tasks to map tasks in order to enable parallelism across iterations.

Nimble can be incrementally deployed in existing HADOOP® deployments and be easily combined with other performance solutions. Nimble does not require any modification to the HADOOP® stack or API. Experiments have confirmed that Nimble is compatible with alternate HADOOP® stacks.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    identifying a set of map tasks and reduce tasks capable of being reused across multiple iterations of an iterative HADOOP® application; and
    reducing a system load imparted on a computer system executing the iterative HADOOP® application by transforming a source code of the iterative HADOOP® application to launch the map tasks in the set only once and keep the map tasks in the set alive for an entirety of the execution of the iterative HADOOP® application;
    wherein the map tasks in the set are kept alive for the entirety of the execution by guarding an invocation to a runjob( ) function beginning at a first iteration of the iterative HADOOP® application to prevent a re-launching of any of the maps tasks and reduce tasks in the set in subsequent iterations of the iterative HADOOP® application, the invocation to the runJob( ) function is guarded by a flag, which is set to true for the first iteration and false for the subsequent iterations.

2. The method of claim 1, the system load comprises at least one of a cost of re-launching virtual machines, a cost of scheduling tasks in a HADOOP® cluster, and a cost of re-reading invariant input data.

3. The method of claim 1, wherein the reduce tasks in the set are kept alive for the entirety of the execution by selectively inserting a statement to throw an exception at an end of each reduce task in the set, and wherein a decision to insert the statement is based on a result of a convergence check of a corresponding iteration of the iterative HADOOP® application.

4. The method of claim 1,
    wherein the map tasks in the set are kept alive for the entirety of the execution by moving code of a map( ) function of the iterative HADOOP® application to a new map( ) function added to at least one map task in the set and storing key/value pairs in a hash table by the new map( ) function, the key/value pairs representing intermediate results produced by map tasks in the set.

5. The method of claim 4, wherein the map tasks in the set are kept alive for the entirety of the execution by introducing a two-level nested loop in the new map( ) function, the two-level nest loop having an inner loop and an outer loop, wherein the inner loop iterates over the key/value pairs stored in the hash table, and the outer loop supports keeping the map tasks in the set alive for the entirety of the execution.

6. The method of claim 5, wherein the map tasks in the set are kept alive for the entirety of the execution by inserting a statement in the outer loop to invoke an internal HADOOP® function for flushing and closing a data output stream of the iterative HADOOP® application.

7. The method of claim 5, wherein the map tasks in the set are kept alive for the entirety of the execution by inserting a statement in the outer loop to wait for a configuration object of a next iteration of the iterative HADOOP® application.

8. A non-transitory storage medium configured with instructions for carrying out the following steps:
    identifying a set of map tasks and reduce tasks capable of being reused across multiple iterations of an iterative HADOOP® application; and
    reducing a system load imparted on a computer system executing the iterative HADOOP® application by transforming a source code of the iterative HADOOP® application to launch the map tasks in the set only once and keep the map tasks in the set alive for an entirety of the execution of the iterative HADOOP® application;
    wherein the map tasks in the set are kept alive for the entirety of the execution by guarding an invocation to a runjob0 function beginning at a first iteration of the iterative HADOOP® application to prevent a re-launching of any of the maps tasks and reduce tasks in the set in subsequent iterations of the iterative HADOOP® application, the invocation to the runJob( ) function is guarded by a flag, which is set to true for the first iteration and false for the subsequent iterations.

* * * * *